United States Patent
Kawano et al.

(10) Patent No.: US 8,462,405 B2
(45) Date of Patent: Jun. 11, 2013

(54) IMAGE-READING APPARATUS

(75) Inventors: Katsunori Kawano, Ashigarakami-gun (JP); Shin Yasuda, Ashigarakami-gun (JP); Akihiko Naya, Ebina (JP); Kazuo Baba, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 672 days.

(21) Appl. No.: 12/725,019

(22) Filed: Mar. 16, 2010

(65) Prior Publication Data
US 2011/0051204 A1   Mar. 3, 2011

(30) Foreign Application Priority Data
Aug. 26, 2009   (JP) .................................. 2009-195883

(51) Int. Cl.
*H04N 1/46* (2006.01)
*H04N 1/38* (2006.01)

(52) U.S. Cl.
USPC ........... 358/509; 358/505; 358/514; 358/506; 358/463

(58) Field of Classification Search
None
See application file for complete search history.

(56) References Cited

U.S. PATENT DOCUMENTS 5,973,837 A * 10/1999 Hasegawa et al. ............ 359/566
6,064,057 A *  5/2000 Shimomura et al. .......... 250/226
8,304,753 B2 * 11/2012 Yasuda et al. ............. 250/559.04

FOREIGN PATENT DOCUMENTS

JP    A-2006-211234    8/2006

* cited by examiner

*Primary Examiner* — Cheukfan Lee
(74) *Attorney, Agent, or Firm* — Oliff & Berridge, PLC (57) ABSTRACT

An image-reading apparatus includes a light dividing unit that divides irradiated light so that a part of the light having a first wavelength is diffracted, and a part of the light having a second wavelength is transmitted; a first light measuring unit that measures an intensity of light entering into a first measuring area, and outputs first measurement information indicating the measured intensity; a second light measuring unit that measures an intensity of light entering into a second measuring area, and outputs second measurement information indicating the measured intensity; an image-forming unit that forms an image of a subject for reading in the first measurement area, and that forms a virtual image in the second measurement area using light diffracted by the light dividing unit; and a generation unit that corrects the first measurement information on the basis of the second measurement information.

17 Claims, 5 Drawing Sheets

FIG. 9 ly embodiment. Image sensor unit 20 reads an image of a
IMAGE-READING APPARATUS

CROSS-REFERENCE TO RELATED APPLICATIONS

This application is based on and claims priority under 35 USC 119 from Japanese Patent Application No. 2009-195883 filed on Aug. 26, 2009.

BACKGROUND

1. Technical Field

The present invention relates to an image-reading apparatus.

2. Related Art

In connection with image-reading apparatuses, a technique has been proposed to correct fluctuations in brightness caused by a lack of uniformity of an optical system (shading correction).

SUMMARY

An aspect of the present invention provides an image-reading apparatus including: a light dividing unit that divides irradiated light so that a part of the light having a first wavelength is diffracted, and a part of the light having a second wavelength is transmitted; a first light measuring unit that measures an intensity of light entering into a first measuring area, and outputs first measurement information indicating the measured intensity; a second light measuring unit that measures an intensity of light entering into a second measuring area, and outputs second measurement information indicating the measured intensity; an image-forming unit that forms an image of a subject for reading in the first measurement area, the subject for reading being located in an area into which light transmitted by the light dividing unit enters, and that forms a virtual image in the second measurement area, using light diffracted by the light dividing unit; and a generation unit that corrects the first measurement information on the basis of the second measurement information, when generating image information representing an image of the subject for reading.

BRIEF DESCRIPTION OF THE DRAWINGS

Exemplary embodiments of the present invention will now be described in detail with reference to the following figures, wherein.

DETAILED DESCRIPTION

Exemplary Embodiment

Configuration

Figure 1:
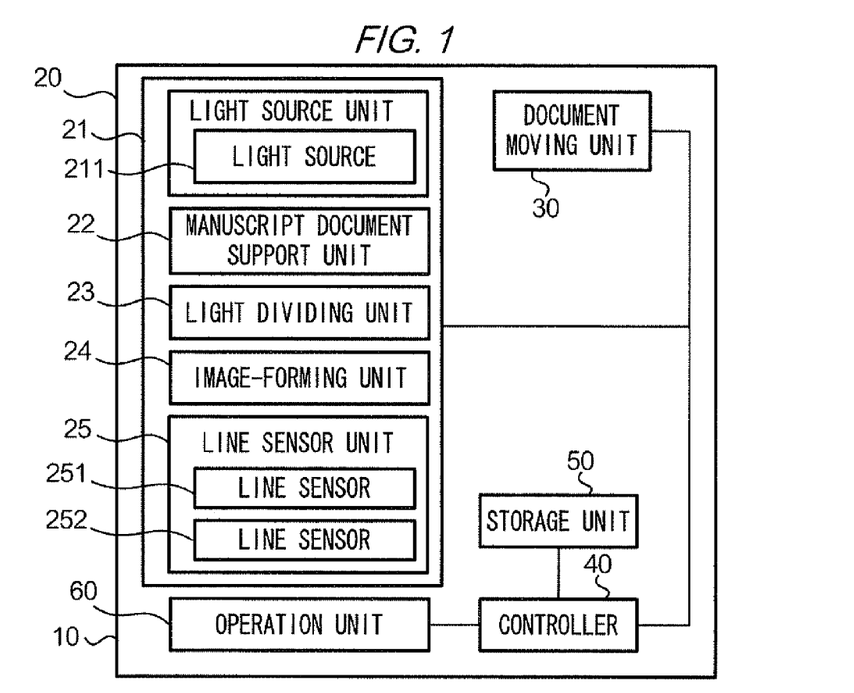
FIG. 1 is a block diagram showing a configuration of image-reading apparatus 10 according to an exemplary embodiment.

FIG. 1 is a block diagram showing a configuration of image-reading apparatus 10 according to the present exemplary embodiment. Image sensor unit 20 reads an image of a predetermined area in manuscript document MS, which area is an object for reading. The operation to read an image of a predetermined area in manuscript document MS by image sensor unit 20 will hereinafter be referred to as a main scanning, and the area read by the main scanning will hereinafter be referred to as reading area RA. Details of image sensor 20 will be described later.

Document moving unit 30 includes, for example, a motor, and after a main scanning is completed, moves manuscript document MS to a position at which a next image can be read. An operation to read an image by image sensor unit 20 while the above movement is repeated will hereinafter be referred to as vertical scanning, and a direction in which manuscript document MS is moved will hereinafter be referred to as a vertical scanning direction. Image sensor unit 20 outputs information on a thus read image to controller 40.

Controller 40 includes a processor such as a CPU (central processing unit) and a storage unit such as a RAM (random access memory), and controls operations of the above-mentioned components to carry out a processing relating to an image, which will be described in detail later. The RAM is used as a work area for carrying out a processing relating to an image. Storage unit 50 includes a storage device such as a ROM (read only memory), a hard disk, or a semiconductor memory, and stores information including image information. Operation unit 60 includes a touch panel or a keyboard by which a user provides an instruction such as selection, confirmation, or cancellation to image-reading apparatus 10, and that outputs information indicating an operation provided by a user to controller 40.

Now, an outline of a configuration of image sensor unit 20 will be described. Light source unit 21 includes light source 211 such as a LED (light emitting diode), and irradiates light to manuscript document MS. Document support unit 22 is a platen made of a light transmissive material such as a glass, and supports manuscript document MS when placed on the platen.

Light dividing unit 23 is made of a material such as a photopolymer, a dichromated gelatin, or silver halide photographic film, and records a hologram. Also, light dividing unit 23 diffracts light of a certain wavelength of light irradiated by light source 211, and transmits light of a wavelength other than the certain wavelength. The diffracted light and the transmitted light reach image-forming unit 24 via a different route that will be described later.

Image-forming unit 24 is a lens for forming an erected same magnification image such as a gradient index lens, and makes light diffracted or transmitted by light dividing unit 23 reach line sensor unit 25.

Line sensor unit 25 includes two line sensors 251 and 252 which include photoelectric conversion elements such as a photodiode. Line sensor 251 measures an intensity of light, of light irradiated by light source 211, that has passed through light dividing unit 23 and has been diffused and reflected by manuscript document MS. Line sensor 252 measures an intensity of light diffracted by light dividing unit 23. Line sensors 251 and 252 generate measurement information on the basis of the measured intensity of light, and output the information to controller 40. The output measurement information is used for generating image information and correcting a brightness of an image by way of a configuration and an operation, each of which will be described later. Below, a more detailed configuration of image sensor unit 20 will now be described with reference to FIG. 2.

Figure 2:
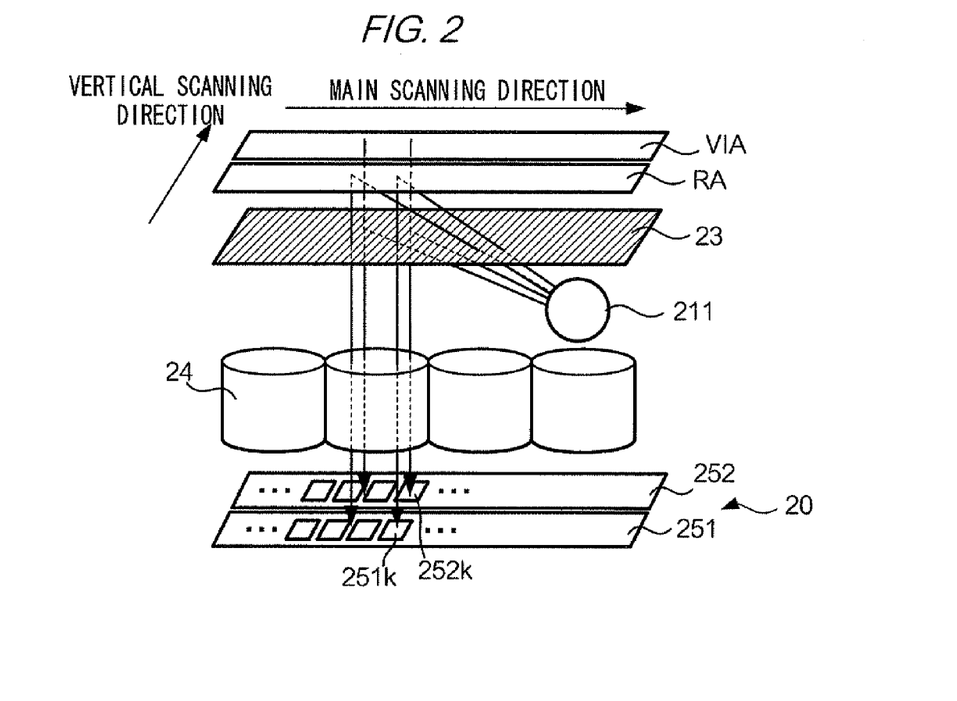
FIG. 2 is a view showing a frame format of image sensor unit 20 according to an exemplary embodiment.

FIG. 2 shows a frame format of image sensor unit 20 according to the present exemplary embodiment. Manuscript document MS, which as stated above is an object for reading, is supported by document support unit 22 (not shown), and an image of reading area RA is read in manuscript document MS. Light source 211 is provided at a position at which it is able to irradiate light to reading area RA of manuscript document MS. It is to be noted that to prevent light irradiated by light source 211 from directly reaching line sensors 251 and 252, a shield (not shown) is provided. Light dividing unit 23 is provided between light source 211 and manuscript document MS supported by document support unit 22, and as described above, diffracts a part of light irradiated by light source 211, and transmits a remaining part of the light. Below, a method of forming a hologram recorded in light dividing unit 23 will now be described.

Figure 3:
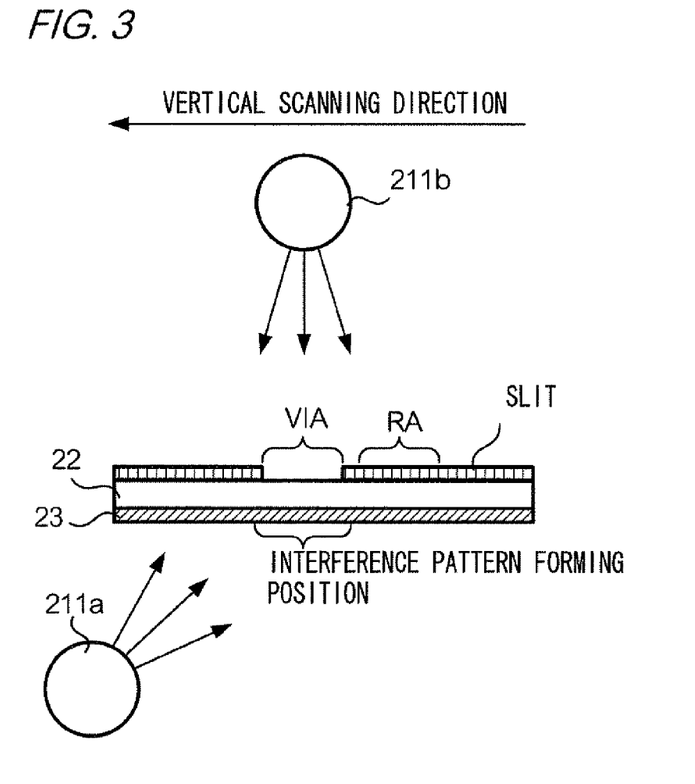
FIG. 3 is a diagram illustrating a method of forming light dividing unit 23.

FIG. 3 is a diagram illustrating a method of forming light dividing unit 23. As shown in the drawing, on each of a side of document support unit 22 that supports manuscript document MS and on the other side, a film of material for recording a hologram is placed, and light source 211*a* for irradiating light to the material is provided. Further, on the side of document support unit 22 that supports manuscript document MS, a slit is provided so that light is able to enter into an area adjacent to reading area RA in a vertical scanning direction, and light source 211*b* for irradiating light to the slit is provided. If light sources 211*a* and 211*b* irradiate light, the rays of light interfere with each other in the above-mentioned material, thereby forming an interference pattern. In the interference pattern, a virtual image of the slit, which is reconstructed if light having a phase identical to that of light source 211*a* is irradiated, is recorded. The virtual image of the slit is formed at the position at which the slit is provided. The area into which light enters through the slit will hereinafter be referred to as virtual image area VIA.

In order to obtain a clear interference pattern, it is preferable to use light having a narrow wavelength distribution which is likely to interfere. Accordingly, in the present exemplary embodiment, laser having a wavelength distribution of several nanometers is used as light of light sources 211*a* and 211*b*. On the other hand, light irradiated by light source 211 is light to be irradiated to manuscript document MS to read an image on the document. Accordingly, in the present exemplary embodiment, white light having a wavelength distribution, which extends across the entire wavelength of visible light, is used as light for light source 211. If light source 211 irradiates light to light-dividing unit 23, light of a certain wavelength, which centers on a wavelength of light used to record an interference pattern, is diffracted.

Figure 4:
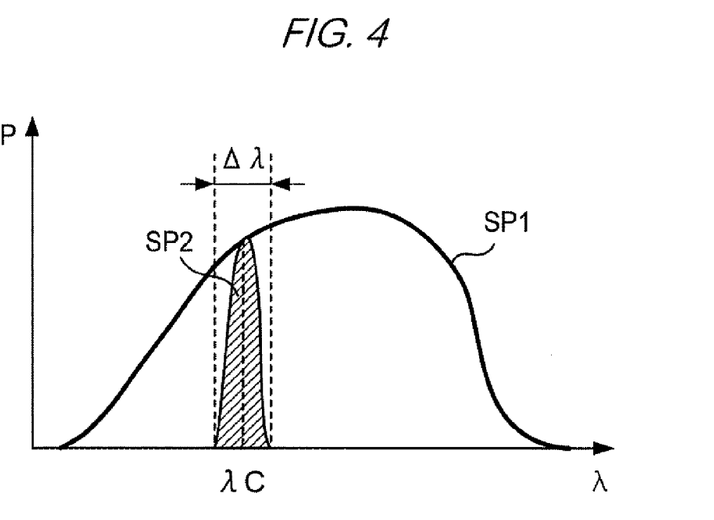
FIG. 4 is spectra of light irradiated by light source 211 and light diffracted by light dividing unit 23.

FIG. 4 is spectra of light irradiated by light source 211 and light diffracted by light dividing unit 23. The horizontal axis of the drawing indicates wavelength λ of light, and the vertical axis indicates intensity P of diffracted light. Spectrum SP1 indicates a wavelength distribution of light irradiated by light source 211, and spectrum SP2 indicates a wavelength of light diffracted by light dividing unit 23. A width Δλ of the wavelength distribution of diffracted light (spectrum SP2) is expressed in the following equation, using center wavelength λC, thickness L of light dividing unit 23, refractive index n, and angle α formed by rays of light irradiated by light sources 211*a* and 211*b* when an interference pattern is recorded.

$$\Delta\lambda = \frac{\lambda C^2}{2nL\sin^2\left(\frac{\alpha}{2}\right)}$$

As expressed in the equation above, the wavelength distribution of diffracted light can be controlled by changing a material or thickness of light dividing unit 23. For example, in a case where a hologram is recorded in a recording material having a refractive index of 1.5 and thickness of 10 μm, using light having a center wavelength of 500 nm, a wavelength of diffracted light is distributed within a range of approximately 10 nm centering on a wavelength of 500 nm. As described in the foregoing, light dividing unit 23 is formed so that light of a certain wavelength, of light irradiated by light source 211, is diffracted, and a larger part of non-diffracted light is allowed to pass and reach manuscript document MS.

FIG. 2 is now referred to again. Light that has passed through light dividing unit 23 is defused and reflected in reading area RA of manuscript document MS, and a part of the light is guided by image-forming 24 to line sensor 251. On the other hand, a part of light that has been diffracted by light dividing unit 23 is guided by image-forming unit 24 to line sensor 252.

Line sensors 251 and 252 include plural photoelectric conversion elements arranged in a line, and measure intensity of light entering into an area in which the photoelectric conversion elements are arranged. The direction in which the photoelectric conversion elements are arranged in a line will be referred to as a main scanning direction. The area in which intensity of incident light is measured will be referred to as measurement area 251*k* and 252*k*. The photoelectric conversion elements generate charges on the basis of intensity of light entering into measurement area 251*k* or 252*k*. Line sensor 251 and 252 generate electric signals on the basis of the generated charges, and after amplifying the signals, output them to controller 40. The output electric signals are signals indicating measurement information generated by line sensor 251 or 252, and they each have values corresponding to the intensity of the light that has entered into measurement area 251*k* or 252*k*.

Line sensor 251 is arranged so that an image of reading area RA of manuscript document MS is formed in measurement area 251*k* by image-forming unit 24 as an erected image with the same magnification. In other words, an area whose image is formed in measurement area 251*k* by image-forming unit 24 is reading area RA. On the other hand, line sensor 252 is arranged so that a virtual image of a slit formed in virtual image area VIA by light diffracted by light dividing unit 23 is formed in measurement area 252*k* by image-forming unit 24 as an erected image with the same magnification. Thus arranged line sensors 251 and 252 are adjacent to each other in a vertical scanning direction. In line sensors 251 and 252, measurement areas 251*k* and 252*k* adjacent to each other in a vertical scanning direction have a corresponding relation. If an image of reading area RA of manuscript document MS is formed in measurement area 251*k*, line sensor 251 reads the image of manuscript document MS by measuring an intensity of light entering into measurement area 251*k*. On the other hand, if a virtual image of a slit formed in virtual image area VIA is formed in measurement area 252*k*, line sensor 252 reads the virtual image of the slit by measuring an intensity of light entering into measurement area 252k.

[Operation]

An operation relating to correction by image-reading apparatus 10 according to the present exemplary embodiment will now be described. To begin with, an operation of reading an image will be described with reference to FIG. 5.

Figure 5:
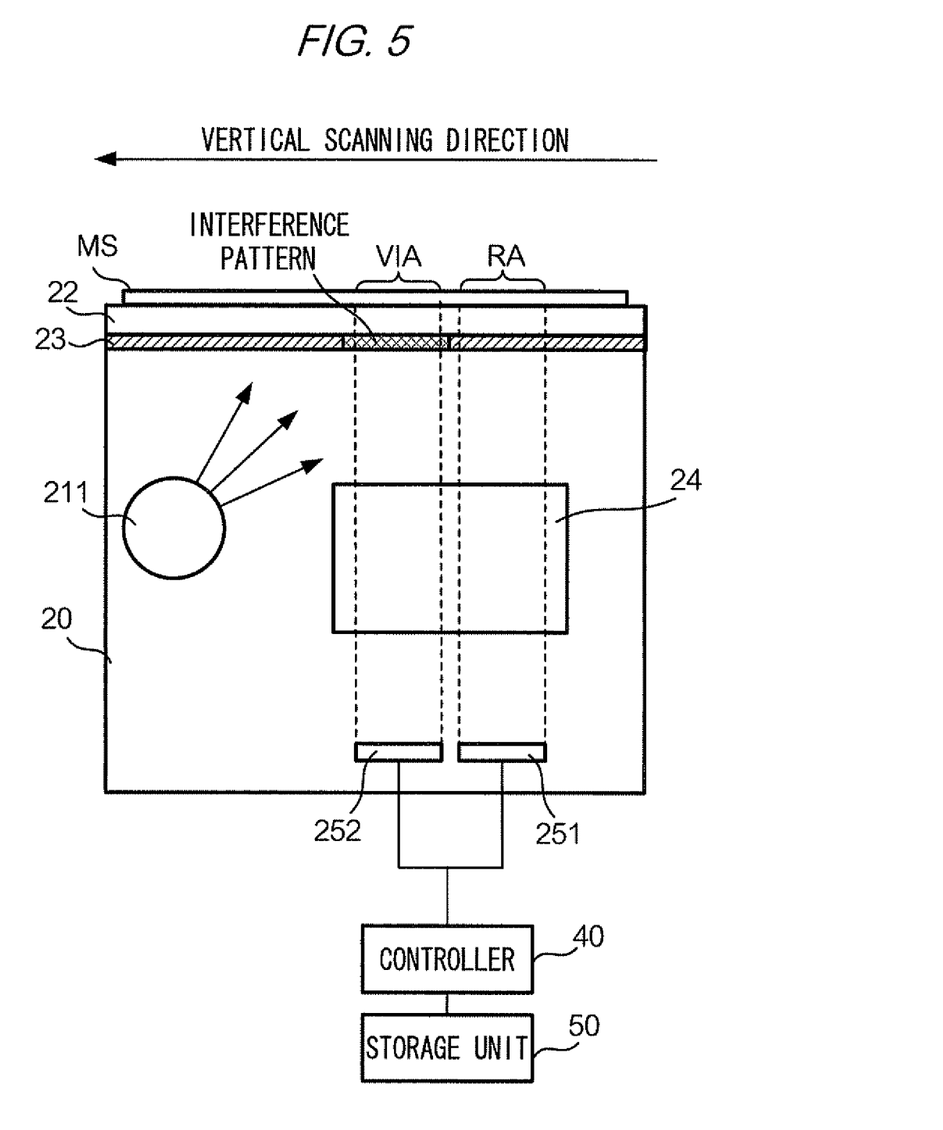
FIG. 5 is a view showing a frame format of image sensor unit 20 according to an exemplary embodiment.

FIG. 5 is a view showing a frame format of image sensor unit 20 according to the present exemplary embodiment. As described above, measurement information generated by line sensor 251 on the basis of light diffused and reflected in reading area RA is output to controller 40, and stored in storage unit 50 by the controller. Line sensor unit 20, each time it reads an image from manuscript document MS that has been moved by document moving unit 30 (not shown) in a vertical scanning direction, outputs measurement information to controller 40. On the basis of measurement information accumulated as a result of the above operation, controller 40 generates image information according to an image of manuscript document MS. Such image information will hereinafter be referred to as manuscript document image information.

On the other hand, measurement information generated by line sensor 252 on the basis of light diffracted by light dividing unit 23 is, as described above, output to controller 40 and stored in storage unit 50 by the controller. Controller 40 generates on the basis of the measurement information, image information representing a virtual image of a slit formed in virtual image area VIA. It is to be noted that light reaching line sensor 252 may include light diffused and reflected in virtual image area VIA of a manuscript document; however, such light is not brighter than light diffracted by light dividing unit 23. Therefore, the image information representing a virtual image of a slit is not affected by a content of manuscript document MS. Accordingly, the image information can be used as reference information when measurement is made of fluctuations in brightness of manuscript document image information, which fluctuations arise in an optical system when manuscript document MS is read by image-reading apparatus 10. Such image information will hereinafter be referred to as brightness information.

As described above, light irradiated by light source 211 is divided by light dividing unit 23, and the light thus divided reaches one of measurement areas 251k and 252k through a respective different path. Accordingly, when an image of reading area RA of manuscript document MS is read and manuscript document image information is generated, a virtual image in virtual image area VIA is read and brightness information is generated also. The thus generated brightness information is compared with predetermined reference brightness information, for example, information on a reference value of brightness measured when an optical system is operating under optimum conditions, so as to measure (accurately) fluctuations in brightness arising in the optical system.

After fluctuations are measured on the basis of an intensity of light measured in measurement area 252k, controller 40 reflects the measured fluctuations in measurement information obtained from corresponding measurement area 251k, so as to correct accordingly a brightness of pixels included in manuscript document image information. For example, in a case where a reference brightness is set as 255, and a value of a light intensity measured in measurement area 252k is 230, it is determined that light that has reached line sensor unit 25 via image-forming unit 24 has an intensity of 230/255 of the reference brightness. In this case, a value of a brightness of pixels that are included in manuscript document image information corresponding to measurement information measured in measurement area 251k corresponding to measurement area 252k, is corrected so that the value increases as a factor of 255/230.

As described above, measurement area 252k of line sensor 252 is arranged adjacent to measurement area 251k of line sensor 251 in a vertical scanning direction, and processing of correction is carried out in units of measurement areas 251k and 252k. Accordingly, correction of fluctuations in brightness is carried out for each area in which measurement areas 251k and 252k are arranged. Correction processing is carried out each time a main scan is conducted. However, processing may also be carried out after a vertical scan is carried out, and manuscript document image information is generated. Alternatively, such processing can be carried out each time measurement information is output from measurement areas 251k and 252k.

As a result of the above processing, controller 40 corrects a brightness of pixels included in manuscript document image information on the basis of a reference brightness represented by reference brightness information. Subsequently, controller 40 generates corrected image information on the basis of the corrected brightness, and stores the information in storage unit 50. The manuscript document image information and the brightness information are both generated on the basis of information on an intensity of light that has been irradiated by light source 211 to measurement areas 251k or 252k via image-forming unit 24, and measured in measurement areas 251k or 252k. In image-reading apparatus 10, fluctuations in brightness caused by an optical system including light source 211 and image-forming unit 24 is measured while an image of manuscript document MS is read. Accordingly, if fluctuations in brightness occur due to conditions existing in an optical system while an image is being read, manuscript document image information is corrected on the basis of brightness information indicating the fluctuation to generate corrected image information in which an effect of the fluctuation is cancelled.

The exemplary embodiment of the present invention as described above, may be subject to a variety of modifications some examples of which are explained below.

Modification 1

Figure 6:
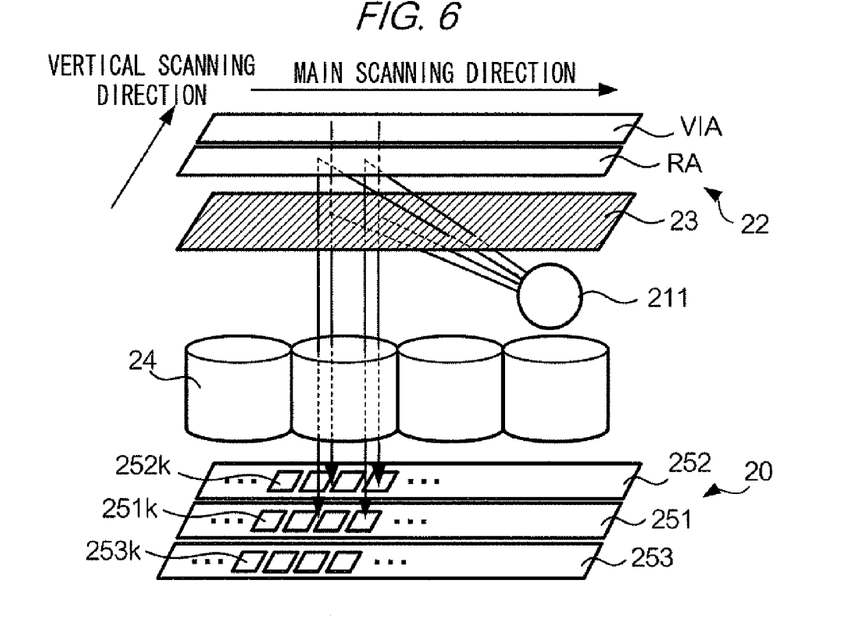
FIG. 6 is a view showing a frame format of image sensor unit 20 according to modification 1.

In the above exemplary embodiment, where fluctuations in brightness caused by an optical system including a light source and image-forming unit 24 are measured, and manuscript document image information is corrected, fluctuations in electric signals that are caused by anything other than light reaching measurement area 251k via image-forming unit 24, may be further measured, and manuscript document image information may be thus corrected. Such other causes of fluctuations in electric signals could include, for example, electrical noise such as a dark current of a line sensor, or a noise caused by light reaching measurement area 251k without passing through image-forming unit 24.

FIG. 6 is a view showing a frame format of image sensor unit 20 according to modification 1. Line sensor 253 includes plural photoelectric conversion elements arranged in a line. The sensor measures an intensity of light entering an area in which the photoelectric conversion elements are arranged, generates measurement information, and outputs the information to controller 40. The area in which an intensity of incident light is measured will hereinafter be referred to as measurement area 253k. Line sensor 253 is arranged at a position where light passing through image-forming unit 24 does not enter measurement area 253k. Also, line sensor 253 is arranged adjacent to line sensor 251 in a vertical scanning direction. In line sensors 251 and 253, measurement areas 251k and 253k adjacent to each other in a vertical scanning direction have a corresponding relation. The plural photoelectric conversion elements that measure an intensity of light in measurement area 253k are not affected by content of reading area RA of manuscript document MS. When an image of reading area RA of content MS is read to generate manuscript document image information, measurement information of measurement area 253k is generated by line sensor 253, and output to controller 40.

The measurement information indicates fluctuations in electric signals caused by anything other than light reading measurement area 251k via image-forming unit 24, and is used to measure a value of a noise in electric signals for reading an image. Such measurement information will hereinafter be referred to as noise information. A value of the measurement information is compared with a predetermined reference value, which is a value measured in measurement area 253k when no noise is generated, and the difference between the value of the measurement information and the reference value is identified as a value of a noise. Controller 40 corrects measurement information for each measurement area 251k based on a value of noise measured in corresponding measurement area 253k.

For example, in a case where a reference value for measurement area 253k is 0, and a value of noise information measured in measurement area 253k is 5, correction is made so that the value of noise, 5, is subtracted from a brightness measured in measurement area 251k corresponding to measurement area 253k when an image of manuscript document MS is read. Correction processing is carried out in units of measurement areas 251k and 253k and thereby noise existing in each measurement area measurement area 251k is corrected. Correction processing may be carried out each time a main scan is performed. It is to be noted that in the present modification, if it is not necessary to measure an intensity of leaked light, a cover that does not transmit light may be placed over line sensor 253k to prevent light from entering the sensor.

As described in the foregoing, controller 40 corrects a brightness of pixels included in manuscript document image information on a basis of a value of a noise measured in measurement area 253k. Subsequently, controller 40 generates corrected image information on a basis of the corrected brightness, and stores the information in storage unit 50. The value of noise is measured while an image of manuscript document MS is read. Accordingly, if an amount of noise varies during reading of an image, the noise can be measured, and manuscript document image information corrected on the basis of the measured noise so as to generate corrected image information in which any effect of noise is cancelled.

Modification 2

Figure 7:
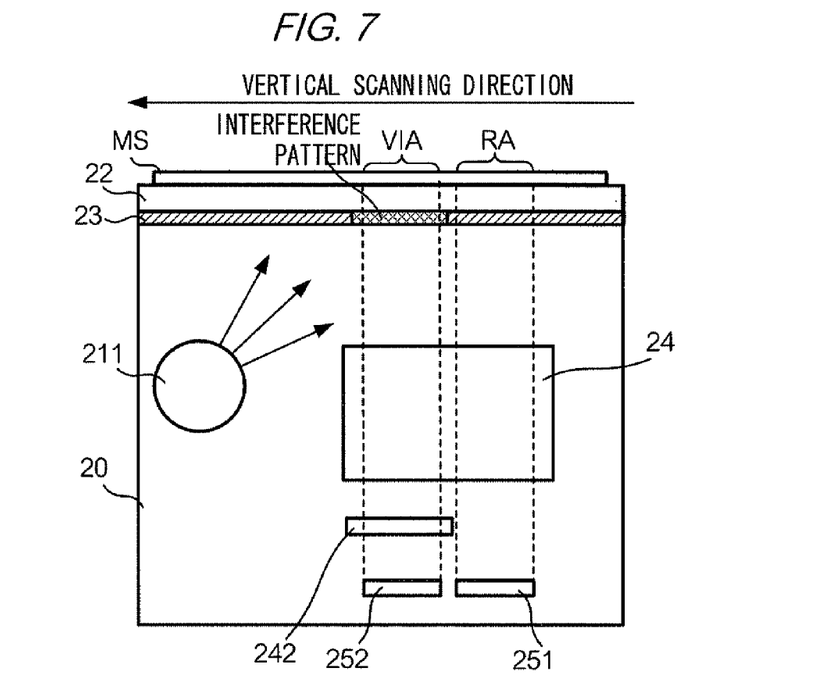
FIG. 7 is a view showing a frame format of image sensor unit 20 according to modification 2.

In the above exemplary embodiment, light is used by image-forming unit 24 to form an image in line sensor 252, without restricting entrance of any part of the light. However, the light may include light diffused and reflected in virtual image area VIA, which is not light diffracted by light dividing unit 24, as described above, and it is preferable that such light be removed. Accordingly, a filter may be provided to restrict entrance of light other than light diffracted by light dividing unit 23, on a path connecting line sensor 252 and image-forming unit 24. For example, the filter may restrict entrance of light other than light having a particular wavelength that is diffracted by light dividing unit 23.

FIG. 7 is a view showing a frame format of image sensor unit 20 according to modification 2. Filter 242 is an optical filter that transmits light of a particular wavelength that is diffracted by light dividing unit 23. Filter 242 is provided between line sensor 252 and image-forming unit 24, and restricts entrance of light into measurement area 252k such as light diffused and reflected in a surface of a manuscript document and that is not light diffracted by light dividing unit 24. According to such a configuration, an S/N (signal-noise) ratio of electric signals output from line sensor 252 can be improved. It is to be noted here that it is not necessary for filter 242 to restrict entrance of all light other than that diffracted by light dividing unit 23. Also, filter 242 may restrict entrance of a part of light other than that diffracted by light dividing unit 23. Moreover, it is to be noted here that filter 242 may be placed immediately over measurement area 252k of line sensor 252 to further prevent leaked light from entering measurement area 252k.

Modification 3

Figure 8:
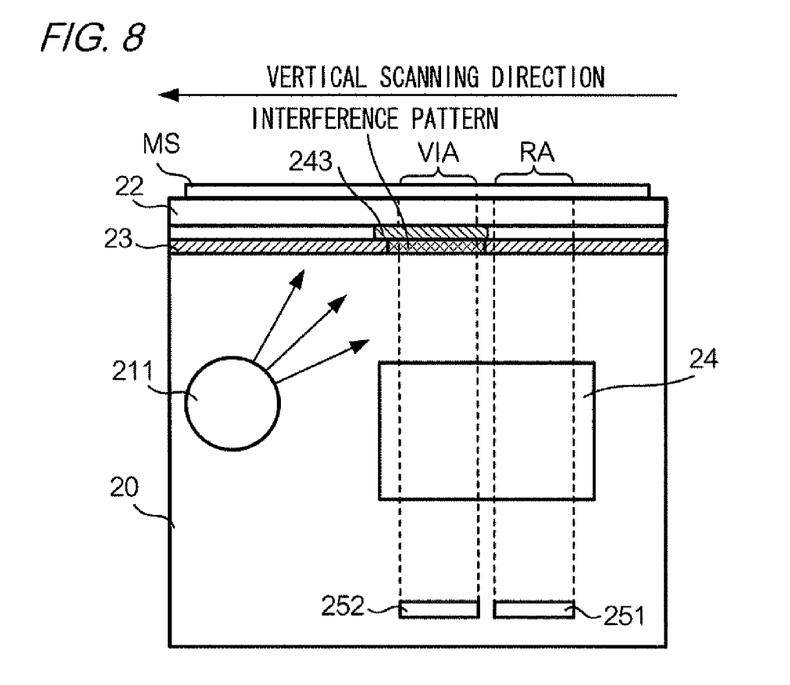
FIG. 8 is a view showing a frame format of image sensor unit 20 according to modification 3.

In contrast to modification 2 where entrance of light that has been diffused and reflected in virtual image area VIA, into measurement area 252k is restricted by imposing a restriction based on a wavelength of light, a shading plate may be used to block a part of light directed to measurement area 252k.

FIG. 8 is a view showing a frame format of image sensor unit 20 according to modification 3. Shading plate 243 is provided between manuscript document support unit 22 and light dividing unit 23, which covers virtual image area VIA of manuscript document MS. Shading plate 243, without blocking light irradiated from light source 211 to manuscript document MS and light diffused and reflected in reading area RA of manuscript document MS and led to line sensor 252 via image-forming unit 24, blocks light diffused and reflected in virtual image area VIA of manuscript document MS and led to measurement area 252k via image-forming unit 24. According to this configuration, as compared with one in which shading plate 243 is not provided, an S/N ratio of electric signals output from line sensor 252 can be improved. It is also to be noted here that in FIG. 8, filter 243 is provided such that it covers virtual image area VIA; however, filter 243 may be provided such that it covers another area on condition that the filter does not block light irradiated to manuscript document MS and light diffused and reflected in reading area RA of manuscript document MS and led to line sensor 252. Filter 242 described above may be provided in addition to shading plate 243.

Modification 4

Figure 9:
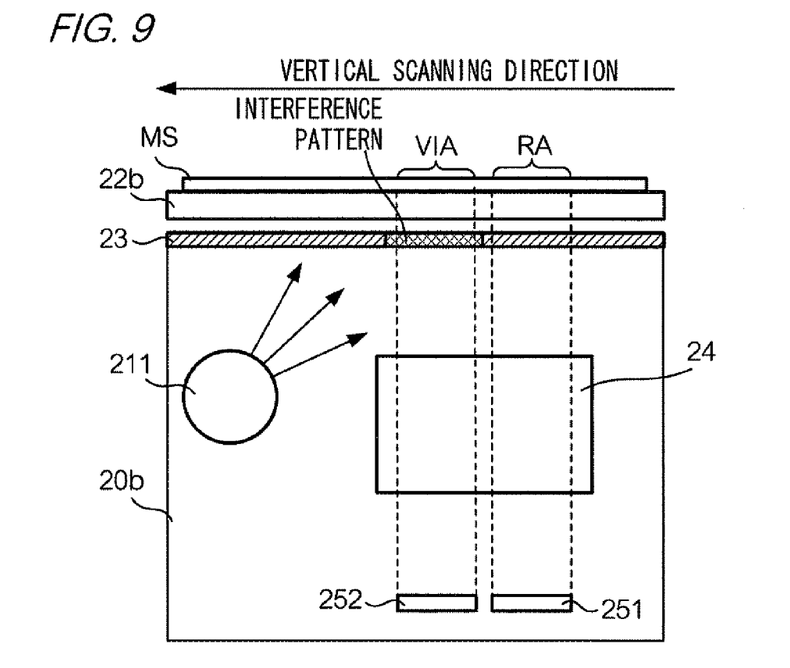
FIG. 9 is a view showing a frame format of image sensor unit 20b according to modification 4.

In the above exemplary embodiment, where manuscript document support unit 22 is a part of image sensor unit 20, the manuscript document support unit may be separated from image sensor unit 20. In this case, image sensor unit 20b changes its position in a vertical scanning direction relative to manuscript document support unit 22b, which is fixed at the body of image-reading apparatus 10, while carrying out a reading operation.

FIG. 9 is a view showing a frame format of image sensor unit 20b according to modification 4. Image sensor unit 20b includes light source 211, image-forming unit 24, and line sensors 251 and 252. Image sensor unit 20b is, if a main scan is made, caused to move in a vertical scanning direction by a sensor unit moving device including a motor (not shown), and thereafter a subsequent main scan is made.

Modification 5

In the above exemplary embodiment, where image-reading apparatus 10 corrects manuscript document image information generated in line sensor 251k on a basis of corresponding brightness information generated in line sensor 252k, image-reading apparatus 10 may correct each and every manuscript document image information on a basis of brightness information generated in single line sensor 252k. In this case, image-reading apparatus 10, while reading an image of a manuscript document, measures fluctuations in intensity of light in single measurement area 252k, and corrects a brightness of pixels included in manuscript document image information.

Modification 6

In the above exemplary embodiment, where image-reading apparatus 10, while carrying out an image-reading operation, generates brightness information, and corrects fluctuations in brightness of image information on the basis of the brightness information, image-reading apparatus 10 may pre-generate brightness information to be used as a reference, determine a method of correction on the basis of the brightness information, and correct manuscript document image information, using the determined method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-reading apparatus comprising:
   a light dividing unit that divides irradiated light so that a part of the light having a first wavelength is diffracted, and a part of the light having a second wavelength is transmitted;
   a first light measuring unit that measures an intensity of light entering into a first measuring area, and outputs first measurement information indicating the measured intensity;
   a second light measuring unit that measures an intensity of light entering into a second measuring area, and outputs second measurement information indicating the measured intensity;
   an image-forming unit that forms an image of a subject for reading in the first measuring area, the subject for reading being located in an area into which light transmitted by the light dividing unit enters, and that forms a virtual image in the second measuring area, using light diffracted by the light dividing unit; and
   a generation unit that corrects the first measurement information on the basis of the second measurement information, when generating image information representing an image of the subject for reading.

2. The image-reading apparatus according to claim 1, wherein:
   the first light measuring unit includes first measuring areas arranged in a line, and outputs first measurement information for each first measuring area;
   the second light measuring unit includes second measuring areas, each of which has a corresponding relation with one of the first measuring areas, and outputs second measurement information for each second measuring area; and
   the generation unit corrects each first correction information on the basis of corresponding second measurement information.

3. The image-reading apparatus according to claim 2, further comprising a third light measuring unit that measures an intensity of light entering into a third measuring area, and outputs third measurement information indicating the measured intensity, the third light measuring unit being arranged so that light is not allowed to enter into the third measuring area when an image is formed by the image-forming unit, wherein the generation unit corrects the first measurement information on the basis of the second and the third measurement information, when generating image information representing an image of the subject for reading.

4. The image-reading apparatus according to claim 3, further comprising a light restriction unit that restricts entrance of light other than light diffracted by the light dividing unit, into the second measuring area.

5. The image-reading apparatus according to claim 4, further comprising a light-blocking unit that blocks light reflected by the subject for reading, from reaching the second measuring area.

6. The image-reading apparatus according to claim 3, further comprising a light-blocking unit that blocks light reflected by the subject for reading, from reaching the second measuring area.

7. The image-reading apparatus according to claim 2, further comprising a light restriction unit that restricts entrance of light other than light diffracted by the light dividing unit, into the second measuring area.

8. The image-reading apparatus according to claim 7, further comprising a light-blocking unit that blocks light reflected by the subject for reading, from reaching the second measuring area.

9. The image-reading apparatus according to claim 2, further comprising a light-blocking unit that blocks light reflected by the subject for reading, from reaching the second measuring area.

10. The image-reading apparatus according to claim 1, further comprising a third light measuring unit that measures an intensity of light entering into a third measuring area, and outputs third measurement information indicating the measured intensity, the third light measuring unit being arranged so that light is not allowed to enter into the third measuring area when an image is formed by the image-forming unit, wherein the generation unit corrects the first measurement information on the basis of the second and the third measurement information, when generating image information representing an image of the subject for reading.

11. The image-reading apparatus according to claim 10, further comprising a light restriction unit that restricts entrance of light other than light diffracted by the light dividing unit, into the second measuring area.

12. The image-reading apparatus according to claim 11, further comprising a light-blocking unit that blocks light reflected by the subject for reading, from reaching the second measuring area.

13. The image-reading apparatus according to claim 10, further comprising a light-blocking unit that blocks light reflected by the subject for reading, from reaching the second measuring area.

14. The image-reading apparatus according to claim 1, further comprising a light restriction unit that restricts entrance of light other than light diffracted by the light dividing unit, into the second measuring area.

15. The image-reading apparatus according to claim 14, further comprising a light-blocking unit that blocks light reflected by the subject for reading, from reaching the second measuring area.

16. The image-reading apparatus according to claim 1, further comprising a light-blocking unit that blocks light reflected by the subject for reading, from reaching the second measuring area.

17. An image-reading apparatus comprising:
   a light dividing means for dividing irradiated light so that a part of the light having a first wavelength is diffracted, and a part of the light having a second wavelength is transmitted;
   a first light measuring means for measuring an intensity of light entering into a first measuring area, and outputting first measurement information indicating the measured intensity;
   a second light measuring means for measuring an intensity of light entering into a second measuring area, and outputting second measurement information indicating the measured intensity;
   an image-forming means for forming an image of a subject for reading in the first measuring area, the image-forming means being located in an area into which light transmitted by the light dividing means enters, and that forms a virtual image in the second measuring area, using light diffracted by the light dividing means; and
   a generation means for correcting the first measurement information on the basis of the second measurement information, when generating image information representing an image of the subject for reading.

\* \* \* \* \*